Patented Oct. 19, 1948

2,451,852

UNITED STATES PATENT OFFICE 2,451,852

BETA-ALLYLAMINO PROPIONITRILES

William M. McLamore, Berkeley, Calif., assignor to Shell Development Company, San Francisco, Calif., a corporation of Delaware No Drawing. Application September 24, 1945, Serial No. 618,402

3 Claims. (Cl. 260—465.5)

This invention relates to novel unsaturated amino nitriles and to a process for their production. More particularly the invention relates to unsaturated amino nitriles comprising unsaturated amines wherein at least one amino hydrogen atom has been replaced by a cyano alkyl radical which is linked to the amino nitrogen atom by a carbon atom which is directly linked to the cyanomethyl radical, and to a process for their production.

It has been found that the valuable unsaturated amino nitriles to which the invention relates are obtained by reacting an alpha,beta-unsaturated nitrile with an unsaturated amine which contains at least one hydrogen atom directly linked to the nitrogen atom.

Examples of suitable alpha,beta-unsaturated nitriles are acrylonitrile, crotonic nitrile, fumaric dinitrile, maleic dinitrile, cinnamic nitrile and nitro-cinnamic nitrile. It is to be understood that there may be used in place of or in addition to the unsaturated nitriles, substances which are capable of producing alpha,beta-unsaturated nitriles under the reaction conditions. For example, allyl cyanide upon heating may be converted to the corresponding alpha,beta-unsaturated nitrile. Therefore if allyl cyanide and/or any other similar cyanide is heated with a suitable unsaturated amine, the unsaturated cyanide produces an alpha,beta-unsaturated nitrile which reacts with the unsaturated amine to form the unsaturated amino nitrile. Similarly, allyl amine may be oxidized to acrylonitrile which may then react with any excess allyl amine present, under the oxidizing conditions, to form the unsaturated amino nitrile. The alpha,beta-unsaturated nitriles are preferably those wherein a hydrogen atom is directly attached to the unsaturated carbon atom which is linked directly to the cyano radical.

The unsaturated amines which may be reacted with the alpha,beta-unsaturated nitriles may be primary or secondary, and the unsaturated secondary amines may have attached to the nitrogen atom in addition to the unsaturated radical, a hydrocarbon radical which may be saturated or unsaturated, cyclic or acyclic. Examples of suitable amines include 1-butenylamine, vinylphenylamine, 1-pentenylamine, 2-pentenylamine, N-methyl 1-butenylamine, N-phenyl 1-butenylamine, dibutenylamine, dipentenylamine, and the like.

Particularly valuable unsaturated amino nitriles comprise those beta,gamma-unsaturated amines wherein at least one of the amino hydrogen atoms has been replaced by a cyano alkyl radical which is linked to the amino nitrogen atom by a carbon atom which is directly linked to the cyanomethyl radical. The members of this preferred group of unsaturated amino nitriles are particularly useful as insecticides, parasiticides and fungicides or as constituents of insecticidal, fungicidal or parasiticidal compositions. Moreover they may find use as perfume fixatives, and are of particular value as intermediates to be used in the formation of valuable polymers and copolymers for use in the resin, plastic and rubber industries. These particularly valuable unsaturated amino nitriles may be prepared by reacting an alpha,beta-unsaturated nitrile with a beta,gamma-unsaturated amine which contains an olefinic linkage between two aliphatic carbon atoms one of which is directly linked to a saturated carbon atom which is attached directly to the amino nitrogen atom which has at least one hydrogen atom directly attached thereto. Examples of suitable beta,gamma-unsaturated amines are allylamine, methallylamine, crotylamine, tiglylamine, diallylamine, N-allyl methallylamine, N-methyl allylamine, N-ethyl allylamine, N-phenyl methallylamine, N-(1-butenyl) allylamine, dicrotylamine, cinnamylamine, N-crotyl allylamine, N-methylcrotylamine, and the like and their homologues and analogues.

When an unsaturated aliphatic primary amine is reacted with an alpha,beta-unsaturated aliphatic nitrile, there is produced an N-mono(cyanoalkyl) alkenylamine and/or an N,N-bis(cyanoalkyl) alkenylamine. For example, allylamine reacted with acrylonitrile produces N-(beta-cyanoethyl) allylamine and/or N,N-bis(beta-cyanoethyl) allylamine; crotylamine reacted with acrylonitrile produces N-(beta-cyanoethyl) crotylamine and/or N,N-bis(beta-cyanoethyl) crotylamine; methallylamine reacted with acrylonitrile produces N-(beta-cyanoethyl) methallylamine and/or N,N-bis(beta-cyanoethyl)-methallylamine. When an unsaturated secondary amine such as N-methyl allylamine is reacted with e. g. acrylonitrile, N-methyl, N-(beta-cyanoethyl) allylamine is produced; diallylamine reacted with acrylonitrile produces N-allyl,N-(beta-cyanoethyl) allylamine, etc.

The reaction between the amine and the nitrile is preferably carried out in the liquid phase, although the vapor phase may be employed in many cases, if desired. The reaction will take place at any temperature from as low as about 20° below zero °C. up to that temperature at which substantial amounts of the reactants and/or products decompose, but it is preferably carried out at a temperature of from about 0° C. to about 175° C. When a primary amine is reacted with the unsaturated nitrile, there is produced an N-mono(cyanoalkyl)alkenylamine and an N,N-bis-(cyanoalkyl)alkenylamine. In general, higher temperatures favor the production of the bis(cyanoalkyl) product, while lower temperatures of about 0° C. to about 50° C., preferably about 10° C. in some cases, result in increased production of the mono(cyanoalkyl) product.

Any convenient type of apparatus may be used, and any suitable pressure may be employed. The operating pressure may be atmospheric, superatmospheric, or even in some cases pressures below atmospheric. The reaction may be carried out in the presence or absence of suitable condensation catalysts, and in the absence or presence of diluents or solvents which may be present in amounts sufficient to bring about solution of at least portions of the reactants and/or products, but not enough to cause excessive dilution or in any other way to interfere wtih the reaction. The diluents or solvents should be substantially inert to the reactants and/or products under the conditions of the reaction and are preferably in the liquid state under the working conditions, for example ethers, aliphatic, cycloaliphatic or aromatic hydrocarbons and halogenated aliphatic hydrocarbons, as well as other inert substances. The unsaturated amine and the alpha, beta-unsaturated nitrile may be reacted in any suitable proportions. Approximately equimolar proportions of the amine and the nitrile are convenient in most cases, particularly when the mono(cyanoalkyl) product is desired. When it is desired to produce the di(cyanoalkyl) product by reacting a primary amine with the nitrile, it is more advantageous to employ a molar excess of the nitrile over the amine.

The novel unsaturated amino nitriles in which the amino group is in beta-position to the —CN group are valuable compounds which may be used in the formation or treatment of natural and synthetic resins, plastics and rubbers, as pesticides or ingredients of pesticidal compositions, and as intermediates in the formation of products such as polymers to be employed in the textile, tanning, dye and related industries. The unsaturated amino nitriles also find use as diluents and solvents, e. g. for albumen, fibrin, sulfur, etc., and serve as intermediates in organic syntheses. For example, the nitrile group on the compound may be saponified, esterified or reacted in other known ways, and the amino group present may also be reacted with acids, alkyl acid chlorides, alkylene oxides and the like.

The following examples illustrate the invention.

Example I

To about 53.1 parts by weight of acrylonitrile were added about 57.1 parts by weight of allylamine, and the mixture was refluxed and the temperature allowed to rise to about 70° C. by the heat of reaction. The mixture was then heated for approximately 5 hours to a maximum temperature of about 135° C., and after standing at room temperature it was distilled to yield about 86.7 parts by weight of beta-allylaminopropionitrile, having a boiling point of 75° C. at 5 mm.

Example II

About 265.5 parts by weight of freshly distilled acrylonitrile were added at about 10° C. to approximately 285.5 parts by weight of allylamine. The temperature was maintained at about 30° C. and the product was distilled to yield about 413 parts by weight of beta-allylaminopropionitrile which had a boiling point of 40° C. to 48° C. at 0.5 mm. to 1 mm. The residue of about 86 parts by weight was distilled to obtain approximately 77 parts by weight of N,N-bis(beta-cyanoethyl)allylamine boiling at 112° C. at 0.5 mm.

Example III

Methallylamine and acrylonitrile are reacted according to the procedure described in Example II to produce good yields of beta-methallylaminopropionitrile and N,N-bis(beta-cyanoethyl)methallylamine.

Example IV

About 201.3 parts by weight of crotonic nitrile are reacted with about 171.3 parts by weight of allylamine following the procedure of Example II, to produce good yields of beta-allylaminobutyronitrile and N,N-bis(beta-cyanoisopropyl)allylamine.

I claim as my invention:
1. Beta-allylaminopropionitrile.
2. N,N-bis(beta-cyanoethyl)allylamine.
3. A n-beta-cyanoethyl substituted allylamine.

WILLIAM M. McLAMORE.

REFERENCES CITED

The following references are of record in the file of this patent:

UNITED STATES PATENTS

| Number | Name | Date |
|---|---|---|
| 2,328,940 | Alderson et al. | Sept. 7, 1943 |
| 1,992,615 | Hoffman et al. | Feb. 26, 1935 |
| 2,195,974 | Reppe et al. | Apr. 2, 1940 |
| 2,228,271 | Jacobson et al. | Jan. 14, 1941 |
| 2,375,016 | Marple et al. | May 1, 1945 |
| 2,394,530 | Bruson et al. | Feb. 12, 1946 |

OTHER REFERENCES

Bruylants, Bull. Soc. Chim. Belg., vol. 32, pages 256–269.